US007987452B2

(12) United States Patent
Kronlund et al.

(10) Patent No.: US 7,987,452 B2
(45) Date of Patent: Jul. 26, 2011

(54) PROFILE-DRIVEN LOCK HANDLING

(75) Inventors: Curtis Duane Kronlund, Cottage Grove, MN (US); Scott Alan Moore, Rochester, MN (US); Gregory Allan Olson, Rochester, MN (US); Mark Douglas Schroeder, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1365 days.

(21) Appl. No.: 11/304,143

(22) Filed: Dec. 15, 2005

(65) Prior Publication Data

US 2007/0169002 A1    Jul. 19, 2007

(51) Int. Cl.
G06F 9/44    (2006.01)
G06F 9/45    (2006.01)

(52) U.S. Cl. ........ 717/127; 717/130; 717/151; 717/158; 718/106

(58) Field of Classification Search .......... 710/200–244; 717/148, 151–161; 707/8–9; 711/151–152; 718/104
See application file for complete search history.

(56) References Cited

U.S. PATENT DOCUMENTS

| 5,502,840 | A | * | 3/1996 | Barton | 710/200 |
|---|---|---|---|---|---|
| 5,768,595 | A | * | 6/1998 | Gillies | 717/145 |
| 5,790,851 | A | * | 8/1998 | Frank et al. | 718/104 |
| 5,892,954 | A | * | 4/1999 | Tomas et al. | 710/200 |
| 5,946,491 | A | * | 8/1999 | Aizikowitz et al. | 717/158 |
| 6,148,300 | A | * | 11/2000 | Singhal et al. | 1/1 |
| 6,449,614 | B1 | * | 9/2002 | Marcotte | 707/8 |
| 6,530,079 | B1 | * | 3/2003 | Choi et al. | 717/158 |
| 6,745,274 | B1 | * | 6/2004 | Snyder et al. | 710/240 |
| 7,089,540 | B2 | * | 8/2006 | Ogasawara | 717/140 |
| 2003/0065704 | A1 | * | 4/2003 | Buch | 709/107 |
| 2004/0024797 | A1 | * | 2/2004 | Berry et al. | 707/206 |
| 2004/0250240 | A1 | * | 12/2004 | Stoodley et al. | 717/116 |

OTHER PUBLICATIONS

Kreahling, W.C. and Norris, C., Profile Assisted Register Allocation, Proceedings of the 2000 ACM Symposium on Applied Computing, 2000, pp. 774-781.*
Eva Andreasson, "New Features and Tools in JRockit 5.0," Feb. 22, 2005, http://dev2dev.bea.com/pub/a/2005/02/jrockit5_new_features.html.
Brian Goetz, "Java Theory and Practice: Synchronization Optimization in Mustang," Oct. 18, 2005, http://www-128.ibm.com/developerworks/java/library/j-jtp10185/.
"BEA JRockit®: Java* for the Enterprise," White Paper, 2005.

* cited by examiner

*Primary Examiner* — Tuan Q Dam
*Assistant Examiner* — Todd Aguilera
(74) *Attorney, Agent, or Firm* — Wood, Herron & Evans, LLP

(57) ABSTRACT

An apparatus, program product and method utilize metadata collected for a lock in a computer program to determine an optimal lock acquisition strategy for the lock. The metadata is typically collected via profiling of the computer program to determine a wait characteristic for the lock in the particular runtime environment in which the computer program executes, and the metadata is used to select from among different lock access implementations to be used to attempt to acquire the lock, often enabling an optimum lock access implementation to be selected for a lock.

24 Claims, 5 Drawing Sheets

PROFILE-DRIVEN LOCK HANDLING

FIELD OF THE INVENTION

The invention relates to computers and computer software, and in particular, to managing concurrent access to data structures and other shared resources in a computer.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. From a software standpoint, multithreaded operating systems and kernels have been developed, which permit computer programs to concurrently execute in multiple threads so that multiple tasks can essentially be performed at the same time.

While parallelism effectively increases system performance by virtue of the ability to perform multiple tasks at once, one side effect of parallelism is increased system complexity due to the need to synchronize the operation of multiple concurrent processes or threads, particularly with regard to data structures and other system resources that are capable of being accessed by multiple processes or threads. Separate processes or threads that are capable of accessing specific shared data structures are typically not aware of the activities of other threads or processes. As such, a risk exists that one thread might access a specific data structure in an unexpected manner relative to another thread, creating indeterminate results and potential system errors.

As an example, the possibility exists that one thread may retrieve data from a data structure, while another thread may later change the data structure in some manner, resulting in each thread seeing a different state for the data structure. Efforts must be made, however, to ensure that the state of a data structure be consistent when viewed by different threads, otherwise indeterminate results can occur.

To address these concerns, a serialization mechanism such as a lock (also referred to as a semaphore) may be used to limit the access to a shared data structure or other shared resource to one process or thread at a time. A lock is essentially a "token" that can be obtained exclusively by a process or thread in a multithreaded environment to access a particular shared resource. Before a process or thread can access a resource, it must first obtain the token from the system. If another process or thread currently possesses the token, the former process or thread is not permitted to access the resource until the token is released by the other process or thread. In this manner, the accesses to the resource are effectively "serialized" to prevent indeterminate operations from occurring.

While locks enable a programmer to ensure complete serialization of a data structure or other shared resource, it has been found that the operations associated with checking the status of locks, acquiring locks, and waiting on locks can add significant overhead, and as a result, have an adverse impact on system performance. As a result, significant efforts have been directed toward optimizing the processing of locks to minimize the impact of such locks and maximize system performance.

The process of attempting to acquire a lock may be performed using a number of different methods; however, typically no one lock acquisition method is optimal for all situations, as some methods are more efficient for lightly contended locks, while others are more efficient for more heavily contended locks. Furthermore, these different methods of attempting to acquire a lock may be chained together to progressively handle lock acquisitions, i.e., so that methods that are more efficient for lightly contended locks will be tried before attempting those methods that are more efficient for more heavily contended locks.

As an example, one method that may be used to attempt to acquire a lock is an inline "fast path" lock acquisition, which simply attempts to acquire a lock on an object when there is little or no contention on that lock. If successful, the inline call receives a "locked" result that indicates that the lock was acquired. If unsuccessful, however, a call is typically made to an external service function to wait for an existing lock on the object to be released. One method that may be used in an external service function is spinning or looping, which places the thread in a wait loop, stalling the thread and periodically checking the status of the lock to see if the lock has been released. In addition, in some designs, spinning may give way to yielding, whereby after spinning for a designated period of time, a thread yields the remainder of its allocated slice of processor resources for use by another thread that can make productive use of those yielded processor resources.

Yet another method that may be used in an external service function, e.g., if spinning and yielding does not result in a successful lock acquisition, is to suspend, or enter a long wait phase, whereby the thread informs a task dispatcher to put the thread to sleep until the lock at issue has been released. Typically, the thread being put to sleep informs the task dispatcher that the thread is waiting on a particular lock such that when another thread releases the lock, the task dispatcher will awaken the sleeping thread and thereby enable the lock to finally be acquired.

For lightly contended locks, often inline or fast path lock acquisition is the most efficient, since the probability is relatively high that the lock will be acquired when it is first accessed. For more heavily contended locks, however, an inline or fast path lock acquisition is often a wasted effort, as in most instances an external service function will have to be called.

While an inline lock acquisition that does not result in a successful lock acquisition is often relatively inexpensive in terms of the number of processing cycles required to perform the check, the insertion of inline lock acquisition code in a program may result in suboptimal register allocation if an external service function is required to be called. Register allocation is a process performed during compilation to assign variables and other data required by a program to the finite set of registers in a processor during execution. As the set of registers is finite, often the data in registers must be replaced with other data as it is needed, with the data that is being replaced either discarded (often referred to as "killed") or saved for later retrieval (often via the insertion of spill and unspill instructions into the program code). External calls, in particular, typically require the data in several registers to be replaced when the call is made, and then restored once the call returns to the original method.

Typically, whenever an external call is expected, the optimal register allocation for the external call is to save and restore registers before and after the external call. As such, for lock acquisition attempts that require an external call, saving and restoring registers is often an optimal register allocation strategy. On the other hand, where lock acquisition attempts do not require an external call, often saving and restoring registers proves unnecessary, and adversely impacts performance, so saving and restoring registers may not be used where inline lock acquisition code is inserted into a program. In those instances where a lock is more heavily contended, however, the register allocation associated with the external function call may not be optimal, and thus lead to lower performance.

In addition, even with more heavily contended locks, the strategy used in an external service function may not prove to be optimal for all circumstances. Spinning typically provides the quickest acquisition once a lock is released by another thread, since the thread that is spinning will typically check the lock on a relatively frequent basis. However, spinning in a loop occupies processing bandwidth that could be put to other uses by other threads. Conversely, with a suspension, the processing bandwidth that would otherwise be used by a thread may be utilized by other threads, but with the drawback that the time required to suspend the thread, and the time required to acquire a lock and resume execution of a thread after the lock has been released by another thread, is often longer thus slowing the response of the thread. In general, therefore, spinning is often more efficient for moderately contended locks, or locks that are often acquired for relatively short periods of time, while suspending is often more efficient for highly contended locks or locks that are often acquired for relatively long periods of time.

Whether a particular lock acquisition strategy will be optimal for a particular lock is often unknown during development of a program, and furthermore, the optimal lock acquisition strategy may vary in different runtime environments depending upon factors such as the number of processors and hardware threads supported by such runtime environments. Accordingly, a need exists in the art for a manner of improving the selection of an optimal lock acquisition strategy for acquiring a lock.

SUMMARY OF THE INVENTION

The invention addresses these and other problems associated with the prior art by providing an apparatus, program product and method that utilize metadata collected for a lock in a computer program to determine an optimal lock acquisition strategy for the lock. The metadata is typically collected via profiling of the computer program to determine a wait characteristic for the lock in the particular runtime environment in which the computer program executes, and the metadata is used to select from among different lock access implementations to be used to attempt to acquire the lock, often enabling an optimum lock access implementation to be selected for a lock.

In some embodiments consistent with the invention, the lock access implementations may vary between one another based upon access type, e.g., inline fast path, spinning, yielding, thread suspension, etc. Moreover, in some embodiments, the lock access implementations may vary between one another based upon register allocation strategy used, in addition to or in lieu of access type. Furthermore, in some embodiments, metadata may be used to determine how much longer a thread currently holding a lock is likely to continue to hold the lock, and select a lock access implementation for the first thread to access the lock accordingly.

Therefore, consistent with the invention, program code configured to access a lock may be processed by accessing metadata associated with the lock to determine a wait characteristic for the lock, and based upon the accessed metadata, selecting from among a plurality of lock access implementations to access the lock.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
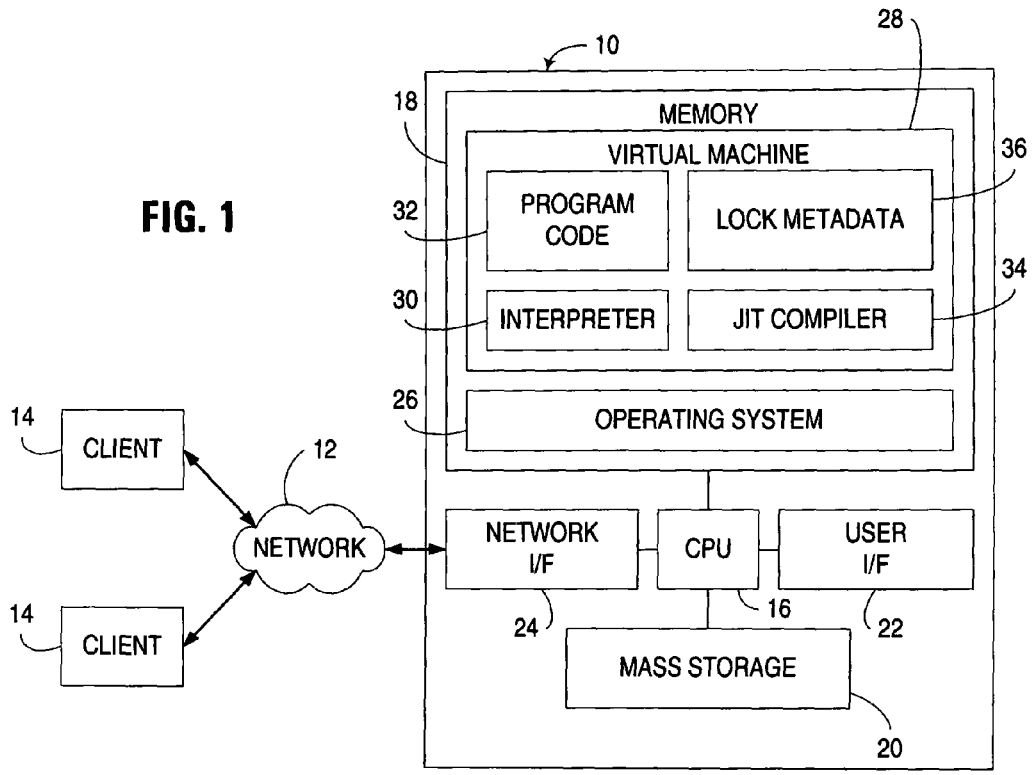
FIG. 1 is a block diagram of the principal hardware components in an apparatus suitable for implementing profile-driven lock handling consistent with the invention.

The embodiments discussed hereinafter utilize metadata collected for a lock in a computer program to determine an optimal lock acquisition strategy for acquiring the lock. The metadata is typically collected via profiling of the computer program to determine a wait characteristic for the lock in the particular runtime environment in which the computer program executes, and the metadata is used to select from among different lock access implementations to be used to attempt to acquire the lock.

The type of metadata that may be collected for a particular lock may vary in different embodiments, including, for example, average, maximum and/or minimum wait time (e.g., represented in units of time, number of instructions and/or number of cycles), average, maximum and/or minimum amount of time a thread held a lock, number of times a lock is acquired with contention or without contention, queue depth (i.e., number of threads contending for a lock while a lock is being held), etc. Moreover, the manners in which such metadata may be collected may vary in different implementations. For example, profile data may be collected during interpretation of interpreted program code and/or during execution of compiled program code. In addition, the collection may be performed by instrumenting program code either manually or automatically, or through the use of a monitor thread. Other known manners of collecting profile information about a program may be adapted to collect lock-related metadata in other embodiments.

In the illustrated embodiments discussed in greater detail below, for example, locks implemented in the JAVA programming environment are profiled and optimized in a manner consistent with the invention. Given that a number of conventional JAVA virtual machines (JVM's) already include a profiling infrastructure adept at collecting other types of profile information, e.g., branch direction, virtual/interface method invocation targets, object types for class cast/type checks, switch statement case frequencies, etc., such JVM's are typically readily adaptable to additionally collect lock-related metadata. In addition, instrumentation of JAVA programs may be performed automatically, e.g., during a class load operations, with actual collection performed for both interpreted methods as well as compiled methods.

As noted above, the collected metadata may be used to select from among a plurality of lock access implementations. In some embodiments consistent with the invention, the lock access implementations may vary between one another based upon access type, e.g., inline fast path, spinning, yielding, thread suspension, etc. Lock access implementations may vary between one another based upon one or more parameters, e.g., a wait time that a particular implementation will wait before performing some other action such as switching to another implementation. Moreover, in some embodiments, the lock access implementations may vary between one another based upon register allocation strategy used, in addition to or in lieu of access type. Furthermore, in some embodiments, metadata may be used to determine how much longer a thread currently holding a lock is likely to continue to hold the lock, such that another thread that is waiting on the lock can select an optimal lock access implementation.

In one exemplary embodiment, e.g., where faster and lower cost lock access implementations are used prior to progressing to slower and higher cost lock access methods, metadata may be used to enter the most common implementation immediately, instead of going through the progression of locking stages or steps every time. In other words, if the lock usually requires a long wait time, the metadata may be used to select an implementation that immediately starts with thread suspension step, instead of first trying to obtain the lock through spinning and yielding. Alternatively, if the lock is usually a very short wait time, earlier steps, such as spinning and yielding, may be elongated, in order to increase the chances of picking up the lock on the earlier steps.

Furthermore, selection of optimal lock access implementations may also be combined with other optimization techniques such as lock coarsening to further improve the handling of locks. For example, selection of an optimal lock access implementation may be performed after lock coarsening has been performed to optimize any coarsened locks. Furthermore, in many embodiments much of the same collected profile information may be used for both purposes.

As yet another example, metadata may be used to perform better register allocation. It has been found, for example, that an inline fast path lock acquisition strategy and an external service function call have different register allocation needs. Since it is possible an external call will be necessary to acquire and/or release a lock even when an inline fast path lock acquisition strategy is used (typically for when the fast path does not successfully acquire the lock), a compiler's register allocator must do one of two things: it must either "kill" all volatile registers each time a lock/unlock is performed, or it must insert register spill/unspill instructions along the external locking service function call paths to save/restore volatile registers. By providing metadata regarding a lock, therefore, a register allocator may use that information to determine which strategy (kill volatile registers or save/restore volatiles along service routine call paths) would be most beneficial based on the lock contention characteristics for the lock.

Still another lock optimization for which metadata may be used involves adjusting a lock acquisition strategy based upon the expected amount of time that another thread may continue to hold a lock. For example, a thread may keep a gauge about a lock that estimates how much longer the thread will hold the lock. The value for the gauge may be computed by using metadata about how long previous threads held the lock. When another thread tries to obtain the lock, that thread may examine the gauge to determine if the lock is likely to be released soon, or if there is a good chance the lock will be held for an extended period of time. Based upon the determination, then the other thread may select between trying to spin and yield for awhile or to immediately initiate a thread suspension process.

Turning now to the Drawings, wherein like numbers denote like parts throughout the several views, FIG. 1 illustrates an exemplary apparatus 10 within which profile-driven lock handling may be performed in a manner consistent with the invention. Apparatus 10 in the illustrated embodiment is implemented as a server or multi-user computer that is coupled via a network 12 to one or more client computers 14. For the purposes of the invention, each computer 10, 14 may represent practically any type of computer, computer system or other programmable electronic device. Moreover, each computer 10, 14 may be implemented using one or more networked computers, e.g., in a cluster or other distributed computing system. In the alternative, profile-driven lock handling consistent with the invention may be implemented within a single computer or other programmable electronic device, e.g., a desktop computer, a laptop computer, a handheld computer, a cell phone, a set top box, etc.

Computer 10 typically includes a central processing unit 16 including at least one microprocessor coupled to a memory 18, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 18 may be considered to include memory storage physically located elsewhere in computer 10, e.g., any cache memory in a processor in CPU 16, as well as any storage capacity used as a virtual memory, e.g., as stored on a mass storage device 20 or on another computer coupled to computer 10. Computer 10 also typically receives a number of inputs and outputs for communicating information externally. For interface with a user or operator, computer 10 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 10 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface 24 with one or more networks 12 (e.g., a LAN, a WAN, a wireless network, and/or the Internet, among others) to permit the communication of information with other computers and electronic devices. It should be appreciated that computer 10 typically includes suitable analog and/or digital interfaces between CPU 16 and each of components 18, 20, 22 and 24 as is well known in the art. Other hardware environments are contemplated within the context of the invention.

Computer 10 operates under the control of an operating system 26 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to computer 10 via network 12, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Now turning to the illustrated embodiment, a runtime environment, taking the form of a JAVA Virtual Machine (JVM) 28, includes an interpreter 30 configured to interpret platform independent program code 32 (typically taking the form of JAVA bytecodes) from one or more JAVA applications installed in the JVM. In addition, as is well known in the art, JVM 28 may additionally include a Just-In-Time (JIT) or other form of compiler 34 that selectively compiles and/or recompiles platform independent program code into native program code suitable for direct (non-interpreted) execution by computer 10.

To implement profile-driven lock handling, lock metadata 36, representative of profile information associated with each of the locks in a given JAVA program, is collected during the execution of a JAVA program, e.g., by interpreter 30 during interpretation of a JAVA program and/or by native code for a JAVA program that has been instrumented to collect such information by JIT compiler 34.

The embodiment discussed hereinafter focuses on an implementation of profile-driven lock handling within the context of a JAVA runtime environment. It will be appreciated, however, that profile-driven lock handling may be implemented in practically any programming and/or runtime environment that utilizes locks or other semaphores to manage synchronization and contention with shared resources in a computer. The invention is therefore not limited to the particular implementations discussed herein.

Figure 2:
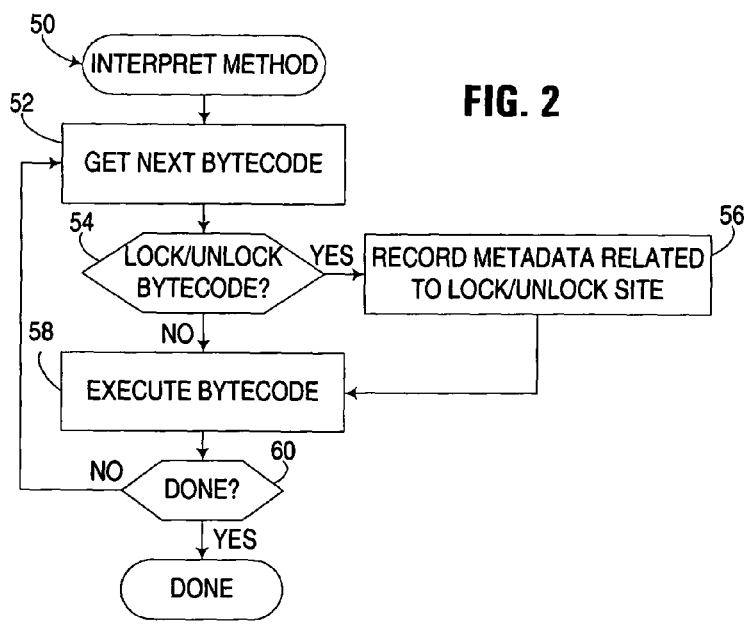
FIG. 2 is a flowchart illustrating the program flow of an interpret method routine performed by the interpreter referenced in FIG. 1.

In order to perform profile-driven lock handling, metadata regarding the locks in a computer program typically must be collected. In a JAVA environment, such collection may be performed on interpreted program code (i.e., JAVA bytecodes) and/or on native code generated as a result of compilation of at least a portion of a JAVA program. FIG. 2, for example, illustrates an interpret method routine 50 that may be executed by the interpreter 28 in connection with interpreting a method that includes a JAVA lock. Routine 50 begins in block 52 by obtaining the next bytecode in the method. Block 54 then determines whether the bytecode is a lock or unlock bytecode, and if so, passes control to block 56 to record metadata related to the lock/unlock site in the method. Control then passes to block 58 to execute the bytecode in a conventional manner. Returning to block 54, if the bytecode is not a lock or unlock bytecode, block 56 is bypassed, and control passes directly to block 58 to execute the bytecode in a conventional manner. Upon completion of block 58, block 60 determines whether interpretation of the method is complete. If not, control returns to block 52 to process the next bytecode. Otherwise, routine 50 is complete.

Of note, it is desirable in many embodiments to instrument interpreter 30 to record metadata for lock and unlock bytecodes encountered during interpretation of a JAVA program. In addition, it may also be desirable to selectively enable the collection of lock metadata such that the interpreter collects such metadata only when specifically enabled to do so. In other environments, it may be desirable to process the bytecodes of a JAVA program prior to interpretation to effectively instrument the program such that a customized interpreter is not required to collect lock metadata.

Figure 3:
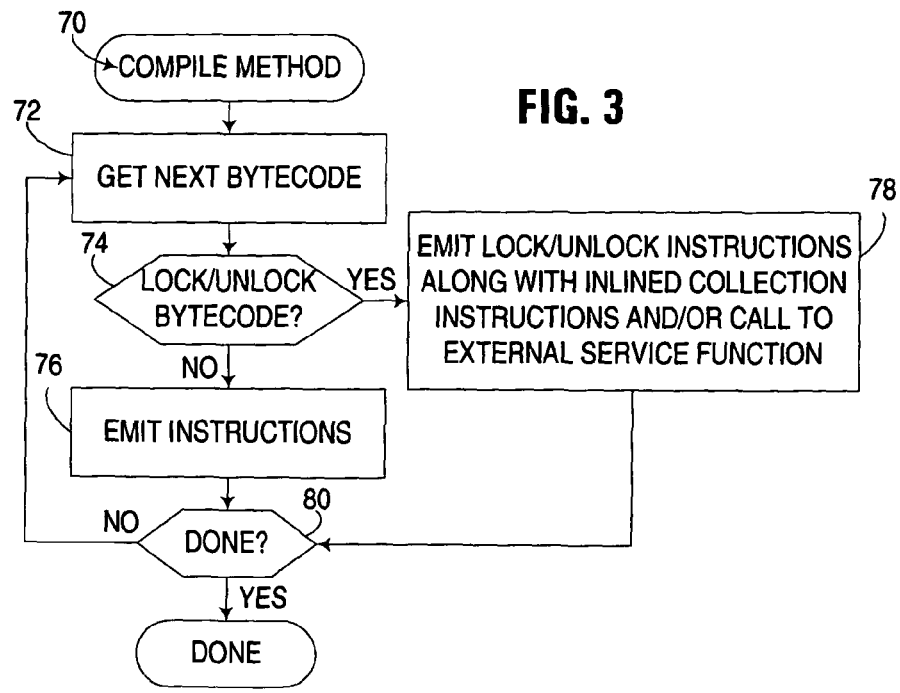
FIG. 3 is a flowchart illustrating the program flow of a compile method routine performed by the JIT compiler referenced in FIG. 1 to instrument a method to collect lock metadata.

In lieu of or in addition to collecting lock metadata from interpreted program code, lock metadata may be collected from compiled program code. Such collection is typically implemented via instrumentation of the program code during compilation thereof, e.g., by JIT compiler 34. In this regard, FIG. 3 illustrates a compile method routine 70 that may be executed by a JIT compiler 34 to instrument a lock within a method during compilation.

Routine 70 begins in block 72 by obtaining the next bytecode in the method. Block 74 then determines whether the bytecode is a lock or unlock bytecode. If not, control passes to block 76 to emit the appropriate native instructions suitable for implementing the bytecode. If, however, the bytecode is a lock or unlock bytecode, block 74 instead passes control to block 78 to emit appropriate lock/unlock instructions, along with additional instructions suitable for collecting profile information regarding the lock site. The instructions that may be utilized to instrument a lock site may vary in different embodiments. For example, the instrumentation may include inline collection instructions that are inserted into the compiled method. In the alternative, the instrumentation may be implemented via a call to an external service function that records the metadata related to the lock site.

Upon completion of either of block 76 or block 78, control passes to block 80 to determine whether compilation of the method is complete. If not, block 80 passes control to block 72 to process additional bytecodes. Otherwise, routine 70 is complete.

It will be appreciated that routine 70 is a simplified representation of a JIT compiler. One of ordinary skill in the art having the benefit of the instant disclosure will appreciate that more complex compilation techniques may be utilized in connection with compilation of a method, e.g., via optimizing compilation, multi-pass compilation, the use of register allocation, etc. Furthermore, the instrumentation of a compiled JAVA program may occur at run time via JIT compilation, or alternatively, may be performed via non-JIT compilation prior to execution of the program.

It will also be appreciated that the type of metadata collected (e.g., average, maximum and/or minimum wait times), the units of measure (e.g., clock time, number of instructions, number of cycles, etc.), as well as the format of the data structures utilized to store the metadata, may vary in different embodiments. Other known manners of collecting profile information may be adapted for collecting lock metadata, as will be appreciated by one of ordinary skill in the art having the benefit of the instant disclosure.

Figure 4:
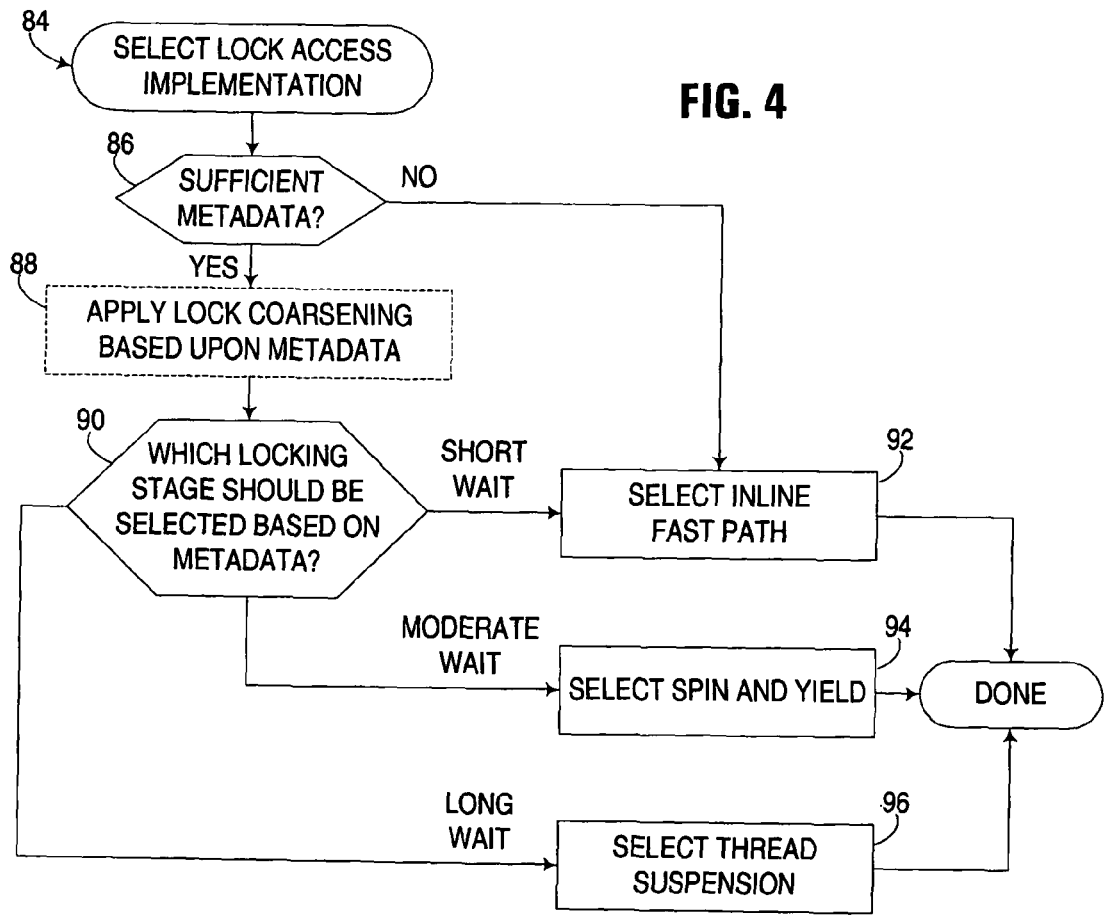
FIG. 4 is a flowchart illustrating the program flow of a select lock access implementation routine performed by the JIT compiler referenced in FIG. 1 to optimize lock handling in a method during compilation.

Once metadata has been collected for a lock, the metadata may be utilized to optimize the handling of the lock in a number of manners consistent with the invention. For example, the metadata may be utilized in connection with compilation of a method attempting to access a lock, e.g., via JIT compilation, or even recompilation of a method that has previously been compiled. FIG. 4, for example, illustrates a select lock access implementation routine 84 that may be called by the JIT compiler 34 when compiling or recompiling a method within which a lock is encountered. It will be appreciated that routine 84 may be called, for example, by routine 70, e.g., within block 78 in connection with determining what instructions to emit for a particular lock. In the alternative, routine 84 may be called during recompilation of a method after appropriate lock metadata has been collected for that method. Even in the event of a recompilation, however, it may be desirable to continue to instrument the method to continue to collect lock metadata and potentially identify future optimization opportunities.

Routine 84 is typically called when a lock is encountered during compilation of a method, and for which it is desirable to optimize the handling of the lock. Routine 84 therefore begins in block 86 by determining whether sufficient metadata exists to optimize the implementation of a lock.

If so, block 88 may optionally be called to apply lock coarsening to the lock and any adjacent locks encountered in the method. Such lock coarsening may be based on much of the same metadata collected for the purposes of profile-driven lock handling. In the alternative, lock coarsening may be performed as a separate process from routine 84, or no lock coarsening may be performed.

After lock coarsening has optionally been performed, control passes to block 90 to select a locking stage to be selected based upon the metadata associated with the lock. In particular, in the illustrated embodiment three locking stages are capable of being selected for initial handling of a lock. Each stage is successively more computationally expensive, and thus suited for locks that are more contended and/or have longer wait times associated therewith. In addition, each lock access implementation, if unsuccessful in acquiring the lock, is configured to proceed to the next, more computationally expensive lock access implementation. As such, routine 84 is configured to select the appropriate starting point for attempting to acquire a lock, rather than simply a single implementation that will be tried until the lock is ultimately acquired. In other embodiments, however, lock access implementations may be exclusive of one another.

The first stage includes an inline fast path lock access implementation, which is most appropriate for locks where it is expected that a short wait will be encountered. The second stage includes a spin and yield lock access implementation, and is most suited for locks having a moderate wait characteristic. The third stage, which is most appropriate for those locks having relatively long wait characteristics, includes a thread suspension lock access implementation.

As such, in the event of detecting a likely short wait characteristic, block 90 passes control to block 92 to select the inline fast path for the initial lock access implementation to be generated in the compiled code. For a moderate wait characteristic, block 90 passes control to block 94 to select the spin and yield lock access implementation for implementation in the compiled code. For a long wait characteristic, block 90 passes control to block 96 to select the thread suspension lock access implementation as the initial implementation to be incorporated into the compiled code. Upon completion of any of blocks 92, 94 and 96, routine 84 is complete, with the selected lock access implementation used to initially attempt to acquire the lock at the lock site in the compiled method. Also, returning to block 86, if sufficient metadata is not present for a given lock, control passes directly to block 92 to select the inline fast path lock access implementation for inclusion in the compiled program code. Other implementations may be used as a default implementation when insufficient metadata exists.

As such, during compilation using routine 84, a lock access implementation that is predicted to be appropriate for a given lock based upon the profile information collected for that lock, is used to select an optimal starting point for attempting to acquire the lock in the compiled code. Consequently, the lock handling is static in nature once the code is compiled.

Figure 5:
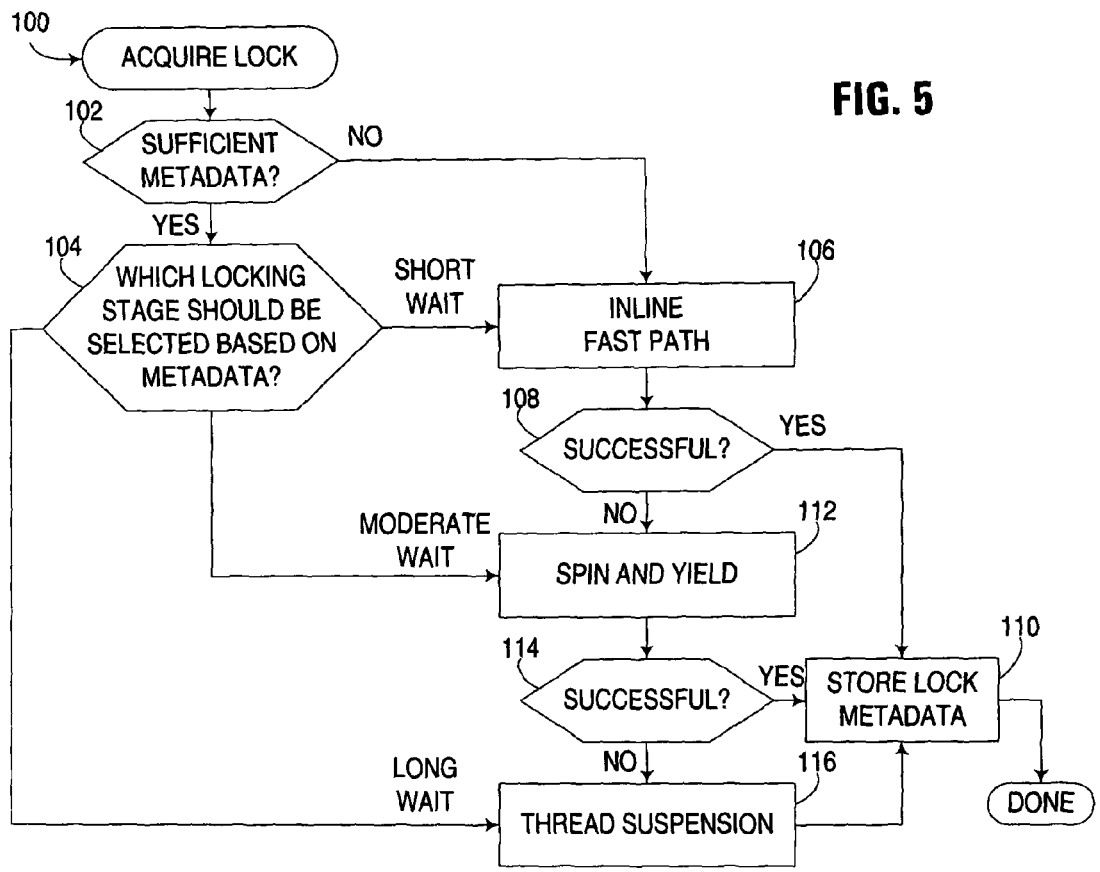
FIG. 5 is a flowchart illustrating the program flow of an acquire lock routine representative of a dynamic lock acquisition implementation capable of being generated for a lock site by the JIT compiler referenced in FIG. 1.

In other embodiments, however, the handling of a lock may be dynamic in nature, based upon the metadata associated with the lock. FIG. 5, for example, illustrates an acquire lock routine 100 that is representative of a dynamic lock acquisition implementation capable of being generated for a lock site by the JIT compiler 34. Therefore, routine 100 is representative of actual program code in a JAVA program that is inserted at a lock site for handling the acquisition of a given lock.

Routine 100 begins in block 102 by determining whether sufficient metadata exists for a lock. If so, control passes to block 104 to determine which locking stage should be selected based upon the metadata associated with the lock. As with block 90 of routine 84, block 104 classifies a lock as having either a short, moderate or long wait characteristic, and passes control to different locking stages accordingly. For a lock having a short wait characteristic, block 104 passes control to block 106 to implement an inline fast path lock access implementation. Then, if the attempt is successful, block 108 passes control to block 110 to store metadata for the lock, whereby routine 100 is complete. If not successful, block 108 passes control to block 112 to enter the second locking stage, whereby a spin and yield lock access implementation is attempted. Moreover, returning to block 104, if it is determined from the metadata for the lock that the lock has a moderate wait characteristic, block 104 passes control to block 112 directly, thereby skipping the inline fast path lock access implementation.

Upon execution of block 112, a spin and yield lock acquisition is attempted, which includes spinning in a loop and periodically checking the status of the lock for a predetermined period of time. Then, upon expiration of the predetermined period of time, the thread yields any remaining time slice allocated to the thread by a task dispatcher, as is generally known in the art. Block 112 then passes control to block 114 to determine whether the attempt to acquire the lock was successful. If so, control passes to block 110 to store metadata for the lock, and routine 100 is complete.

If not successful, however, block 114 passes control to block 116 to perform a thread suspension lock access implementation, whereby the thread is suspended and placed on a wait queue in a task dispatcher, whereby the task dispatcher will awaken the thread once the other thread holding the lock finally releases the lock. Once the lock is acquired, block 116 then passes control to block 110 to store the lock metadata, and routine 100 is complete. Furthermore, returning to block 104, if it is determined that the lock has a long wait characteristic, control passes directly to block 116, thus bypassing both the inline fast path and spin and yield lock access implementations.

Furthermore, returning to block 102, if sufficient metadata is not present for a given lock, block 102 passes control directly to block 106 as a default lock access implementation. In other embodiments, the lack of metadata may result in control being passed to either of block 112 or 116 by default.

It will be appreciated that the spin and yield and thread suspension lock access implementations may be implemented in one or more external service functions, whereby a call to the external service function may be required to attempt to acquire a lock using such an implementation. It will also be appreciated that the collection of lock metadata in block 110 is optional, and may be omitted in some embodiments.

It will be appreciated that different numbers and combinations of locking stages may be utilized in different embodiments. Therefore, the invention is not limited to the three locking stages illustrated in FIGS. 4 and 5.

Figure 6:
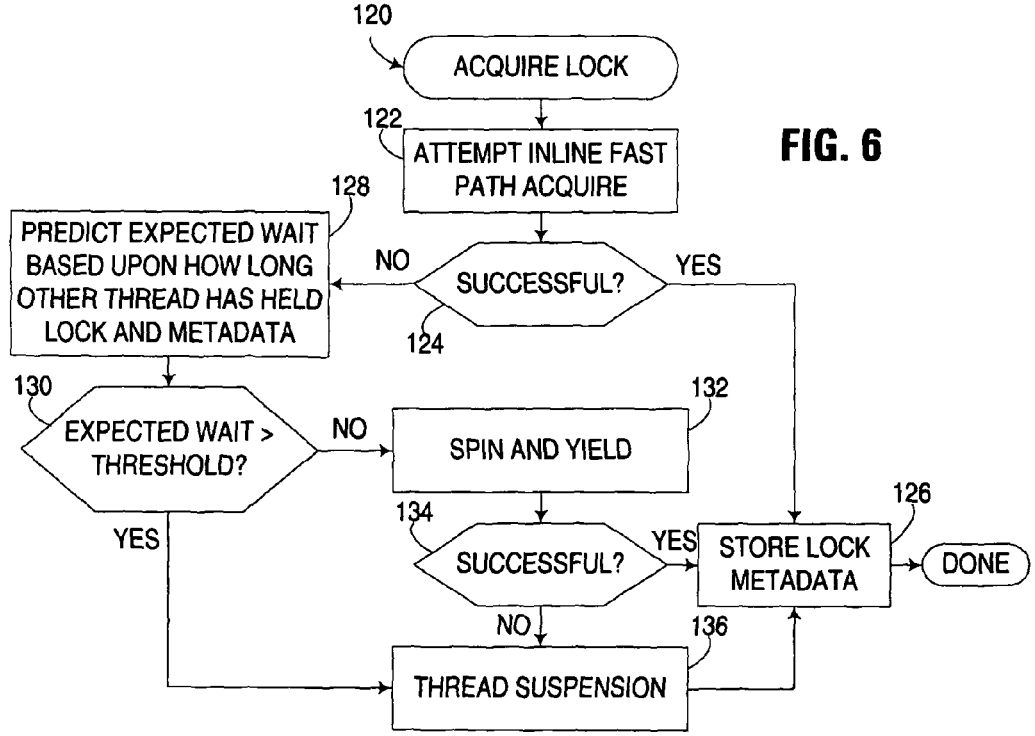
FIG. 6 is a flowchart illustrating the program flow of an alternate acquire lock routine to that illustrated in FIG. 5, and capable of predicting an expected wait on a lock held by another thread.

Another acquire lock routine 120 utilizing dynamic lock acquisition is illustrated in FIG. 6. In particular, routine 120 is configured to predict an expected wait for a lock that is held by another thread based upon both the length of time the lock has already been held by the thread and lock metadata that predicts how long the lock is typically held. Routine 120 begins in block 122 by attempting an inline fast path acquisition of a lock. Block 124 then determines whether the acquisition was successful. If so, control passes to block 126 to store metadata for the lock, and thereafter routine 120 is complete.

However, if the fast path acquisition was unsuccessful, block 124 passes control to block 128 to predict an expected wait for the lock based upon how long the other thread is currently holding the lock, as well as the metadata associated with the lock. Specifically, lock metadata may be used to predict the expected total wait time for the lock, e.g., based upon average/maximum/minimum wait times, average/maximum/minimum amounts of time threads have held the lock, etc. Moreover, a determination may be made as to how long the lock has currently been held by another thread. By taking the difference of these two values, an expected wait may be generated, representative of the amount of time that is likely to pass before the lock will be released by the other thread.

This difference may be compared in block 130 with a threshold value that is selected to distinguish between waits that are likely to be relatively long versus those that are expected to be relatively short. For those waits that are expected to be relatively short, block 130 passes control to block 132 to attempt a spin and yield lock access implementation. If the attempt is successful, block 134 then passes control to block 126 to store metadata for the lock, and terminate routine 120. Otherwise, if not successful, block 134 passes control to block 136 to enter a thread suspension lock access implementation, which, once the lock is acquired, passes control to block 126 to store metadata for the lock and terminate the routine. Moreover, returning to block 130, if the expected wait is greater than the threshold, indicating that a relatively long wait is still expected, block 130 passes control to block 136 to perform a thread suspension lock access implementation, which thereafter proceeds to block 126 to store metadata for the lock and terminate the routine.

It will be appreciated that the amount of time that a thread has currently been holding a lock may be determined in a number of manners, e.g., by utilizing a timer or counter, accessing a time stamp associated with acquisition of the lock by the other thread and comparing the time stamp with a current time. It will also be appreciated that at least blocks 128-136 may be implemented in an external service function that is called upon an unsuccessful inline fast path acquisition attempt.

Figure 7:
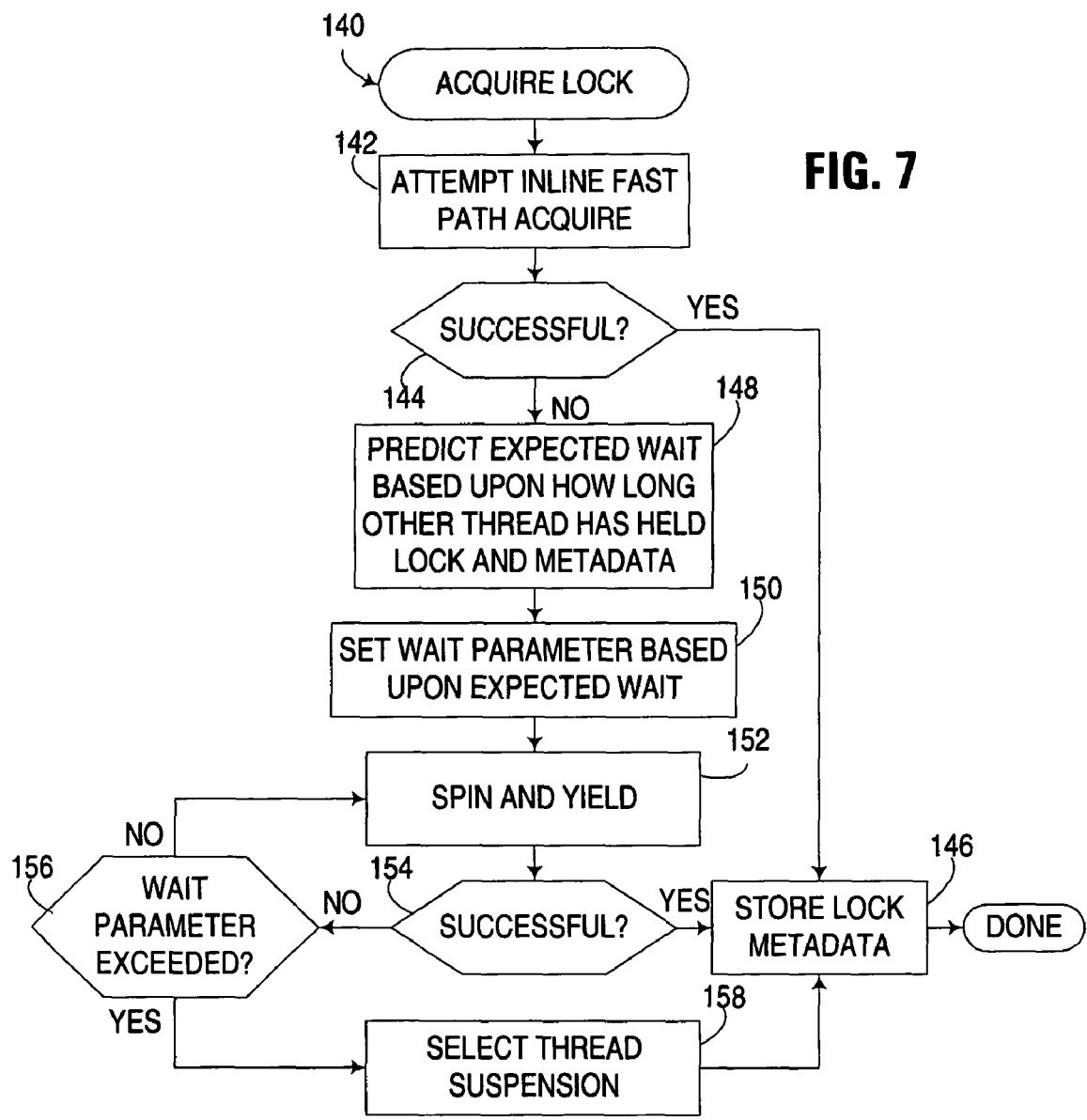
FIG. 7 is a flowchart illustrating the program flow of another alternate acquire lock routine to that illustrated in FIG. 5, and capable of dynamically setting a wait threshold used to switch between lock access implementations.

As noted above, routines 100 and 120 of FIGS. 5 and 6 select from among different lock access implementations based upon metadata associated with a lock. However, lock metadata may also be utilized to control other aspects of lock acquisition consistent with the invention. For example, as illustrated by acquire lock routine 140 of FIG. 7, lock metadata may be utilized to control a parameter associated with acquiring a lock. In this regard, it will be appreciated that two lock access implementations may be identical from a programmatic standpoint, but may differ from one another based upon the setting of a parameter that is common to each implementation.

In addition, it will be appreciated that lock metadata may be utilized to control a number of parameters that are associated with lock acquisition. For example, routine 140 controls a wait time parameter that is utilized to control how long a particular lock implementation attempts to acquire a lock and/or when a switch is made between different lock access implementations. However, other parameters may be controlled in a similar manner, e.g., the amount of time a thread will spin before yielding, the amount of processing resources that may be yielded, etc. Other acquisition-related parameters will be apparent to one of ordinary skill in the art having the benefit of the instant disclosure.

Routine 140 begins in block 142 by attempting an inline fast path acquisition of the lock. If the acquisition is successful, block 144 passes control to block 146 to store metadata for the lock, whereby routine 140 is complete.

If the inline fast path acquisition is unsuccessful, however, block 144 passes control to block 148 to predict an expected wait for the lock based upon how long the other thread has currently held the lock, as well as the metadata associated with the lock, e.g., in the general manner discussed above in connection with block 128 of FIG. 6.

Next, in block 150 a wait parameter is set based upon the expected wait. Block 152 then attempts to acquire the lock via a spin and yield lock access implementation, and block 154 determines whether the acquisition is successful. If so, block 154 passes control to block 146 to store metadata for the lock and terminate the routine. If the acquisition is unsuccessful, however, block 154 passes control to block 156 to determine whether the wait parameter set in block 150 has been exceeded. If not, block 156 passes control to block 152 to again attempt to acquire the lock via the spin and yield lock access implementation. If the wait parameter has been exceeded, however, block 156 passes control to block 158 to switch to a thread suspension lock access implementation and acquire the lock in that fashion. Control then passes to block 146 to store metadata associated with the lock, and terminate the routine.

It will be appreciated that the spin and yield lock access implementation of block 152 is typically shorter in duration than the spin and yield lock access implementations discussed above in connection with routines 100 and 120. By doing so, the length of the spin and yield lock access implementation may be controlled with greater granularity based upon the expected wait. In practice, for example, if the expected wait is relatively long, it may be desirable to perform a spin and yield lock access implementation for a relatively short period of time, and thus set a relatively low wait parameter, based upon the assumption that the spin and yield lock access implementation will ultimately be unsuccessful, and that thread suspension will likely be unavoidable. On the other hand, if the expected wait is relatively short, it may be worthwhile to remain in a spin and yield lock access implementation for a longer period of time to avoid the additional overhead associated with suspending a thread. As a result, in the latter instance, a longer threshold may be desirable.

Figure 8:
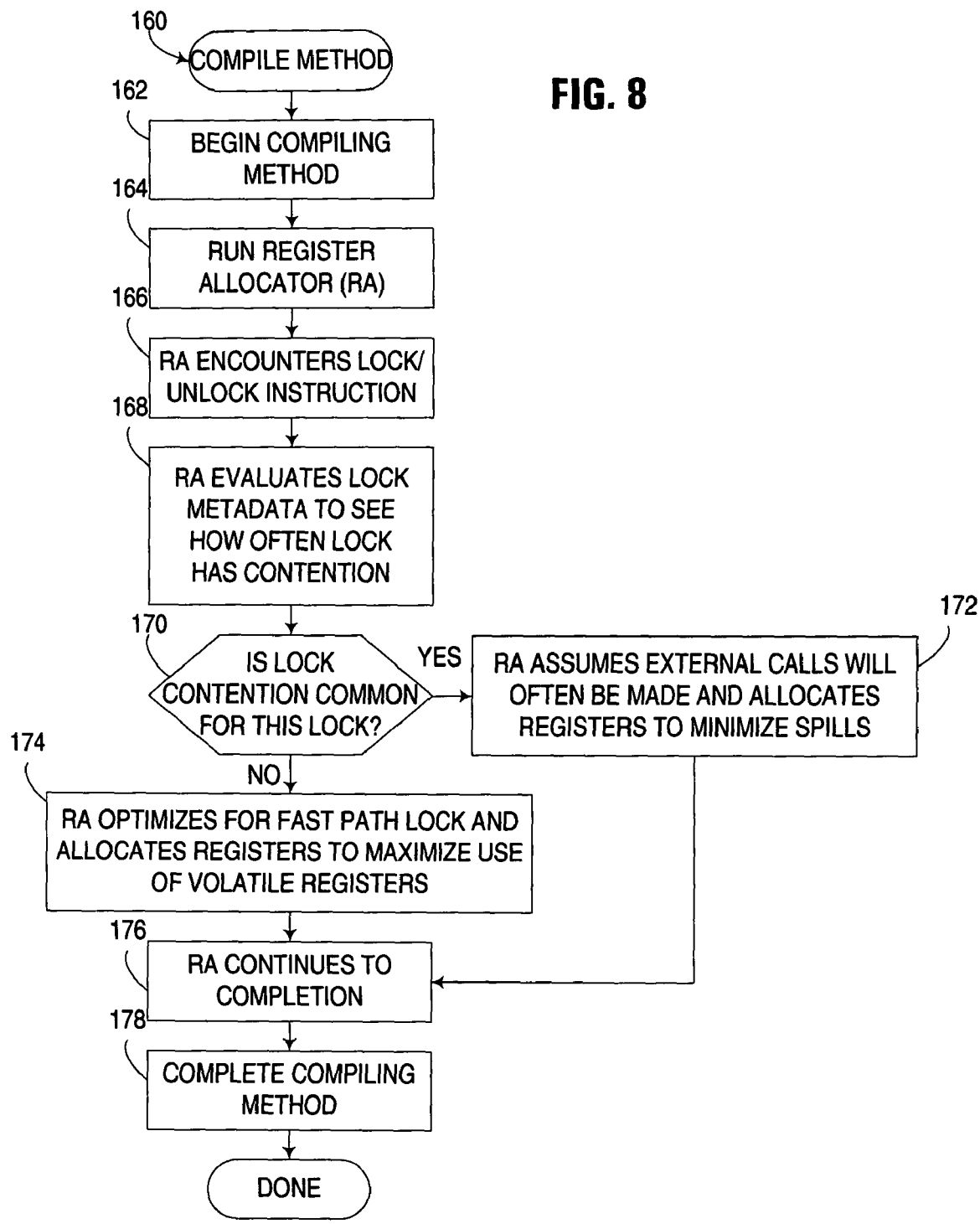
FIG. 8 is a flowchart illustrating the program flow of a compile method routine performed by the JIT compiler referenced in FIG. 1 to optimize register allocation for a lock access implementation during compilation of a method.

As noted above, lock metadata may also be utilized in connection with other optimizations associated with accessing a lock. As one example, lock metadata may be utilized to optimize lock access implementations via selection of an optimized register allocation strategy for a particular lock access implementation. FIG. 8, for example, illustrates a compile method routine 160 suitable for execution by JIT compiler 34 to optimize register allocation for a particular lock access implementation.

It is assumed for the purposes of routine 160 that a particular lock access implementation utilized to access a lock includes a fast path lock access implementation that, if unsuccessful, calls an external service function (which may include spin and yield and/or thread suspension implementations, among others). As will be appreciated by one of ordinary skill in the art having the benefit of the instant disclosure, handling a lock acquisition with an inline access, and handling a lock acquisition with an external service function, often have different register allocation requirements. An external call typically requires a number of registers to be saved when a call is made, and restored once the call is complete—a requirement typically not present for an inline fast path acquisition attempt As such, different register allocation strategies may prove to be optimal for a given lock access implementation based upon whether the lock is expected to be acquired after the initial fast path access or only after an external call is made.

Routine 160 begins in block 162 by initiating the compilation of a method. Block 164 then runs a register allocator (RA) as a component of method compilation.

Next, in block 166, the register allocator encounters a lock or unlock instruction, and in doing so, the register allocator evaluates the lock metadata in block 168 to see how often the lock has contention. Based upon this metadata, block 170 next determines whether lock contention is common for this lock. If contention is common for the lock, block 170 passes control to block 172 to select or employ a register allocation strategy that allocates registers in such a manner to minimize the number of register spills, as the register allocator is able to make the assumption that an inline fast path lock acquisition will typically be unsuccessful, and that an external call will likely need to be made whenever acquisition of the lock is attempted.

On the other hand, if block 170 determines that lock contention is not common for this lock, control is passed to block 174 to optimize register allocation for a fast path lock, as it is assumed that a fast path lock access implementation will typically be successful. As such, in block 174, the register allocator allocates registers to maximize the use of volatile registers, with the assumption made that the frequency of external calls will not be as great for this lock.

Upon completion of either of blocks 172 or 174, control passes to block 176, where the register allocator continues to completion. Block 178 then completes compilation of the method, and routine 160 is complete.

Various additional modifications to the herein-described embodiments will be apparent to one of ordinary skill in the art having the benefit of the instant disclosure. Therefore, the invention lies in the claims hereinafter appended.

What is claimed is:

1. A computer-implemented method of processing program code configured to access a lock, the method comprising:

profiling the program code to collect metadata associated with the lock for a particular runtime environment;

in a first thread attempting to access the lock being held by a second thread, accessing the metadata associated with the lock to determine an expected total wait time for the lock to be held;

tracking a how long the lock has already been held by the second thread while the lock is held by the second thread;

in the first thread, determining from the expected total wait time and how long the lock has already been held by the second thread an expected remaining wait time before the lock is released by the second thread; and based upon the expected remaining wait time and using at least one hardware-implemented processor, selecting from among a plurality of lock access implementations to access the lock.

2. The method of claim 1, wherein the program code comprises program code that is compatible with a JAVA programming environment, and wherein the lock comprises a lock that is compatible with the JAVA programming environment.

3. The method of claim 1, wherein the metadata comprises profile information associated with at least one prior access of the lock.

4. The method of claim 3, further comprising collecting the profile information during execution of the program code.

5. The method of claim 1, wherein accessing the metadata and selecting from among the plurality of lock access implementations are performed during compilation of the program code.

6. The method of claim 5, wherein accessing the metadata and selecting from among the plurality of lock access implementations are performed during just in time compilation of the program code.

7. The method of claim 6, further comprising collecting the metadata during interpretation of the program code.

8. The method of claim 1, wherein accessing the metadata and selecting from among the plurality of lock access implementations are performed during execution of the program code.

9. The method of claim 1, wherein the metadata includes metadata selected from the group consisting of average wait time, maximum wait time, minimum wait time, average time held by a thread, maximum time held by a thread, minimum time held by a thread, number of acquisitions without contention, number of acquisitions with contention, queue depth, and combinations thereof.

10. The method of claim 1, wherein the plurality of lock access implementations includes first and second lock access implementations.

11. The method of claim 10, wherein the first and second lock access implementations differ from one another based upon access method type.

12. The method of claim 11, wherein each of the first and second lock access implementations is selected from the group consisting of an inline fast path lock access implementation, a spin access implementation, a yield access implementation, a thread suspension access implementation, and combinations thereof.

13. The method of claim 11, wherein the first lock access implementation is configured to proceed to the second lock access implementation if unable to obtain the lock, and wherein selecting from among the plurality of lock access implementations based upon the accessed metadata comprises selecting the second lock access implementation such that the first lock access implementation is skipped.

14. The method of claim 10, wherein the first and second lock access implementations differ from one another based upon a parameter common to each lock access implementation.

15. The method of claim 14, wherein the parameter comprises a wait parameter.

16. The method of claim 10, further comprising performing lock coarsening on the program code.

17. The method of claim 10, wherein the first lock access implementation includes an inline access check, and wherein the second lock access implementation is configured to call an external function.

18. The method of claim 10, wherein the first lock access implementation is configured to discard data from at least one volatile register, and wherein the second lock access implementation is configured to save the data from the volatile register.

19. The method of claim 10, wherein selecting from among the plurality of lock access implementations to access the lock includes selecting from among a plurality of register allocation strategies to be used in connection with accessing the lock.

20. The method of claim 1, wherein selecting from among the plurality of lock access implementations to access the lock is performed in a first thread, and includes determining from the accessed metadata how much longer the lock is likely to be held by a second thread that is currently holding the lock.

21. A computer-implemented method of processing program code configured to access a lock, the method comprising:
    profiling the program code to collect metadata associated with the lock for a particular runtime environment;
    accessing the metadata associated with the lock to determine a wait characteristic for the lock; and
    using a register allocator executing on at least one hardware-implemented processor during compilation of a method that accesses the lock using an inline lock access implementation that, if unsuccessful, calls an external function access implementation to acquire the lock, selecting from among a plurality of register allocation strategies to be used in connection with accessing the lock, wherein selecting from among the plurality of register allocation strategies comprises selecting a first register allocation strategy to use during compilation of the method to minimize register spills upon determining from the metadata that lock contention is common for the lock, and selecting a second register allocation strategy to use during compilation of the method to maximize use of volatile registers upon determining from the metadata that lock contention is not common for the lock.

22. A computer-implemented method of processing program code configured to access a lock, the method comprising:
    profiling the program code to collect metadata associated with the lock for a particular runtime environment;
    in a first thread, accessing the metadata associated with the lock when the lock is held by a second thread to determine an expected total wait time for the lock to be held by the second thread;
    tracking a how long the lock has already been held by the second thread while the lock is held by the second thread;
    in the first thread, determining from the expected total wait time and how long the lock has already been held by the second thread an expected remaining wait time before the lock is released by the second thread; and
    based upon the expected remaining wait time and using at least one hardware-implemented processor, selecting a lock access implementation for the first thread to access the lock, wherein selecting the lock access implementation includes selecting a wait parameter that controls how long to wait to change from using a first lock access implementation for the first thread to using a second lock access implementation for the first thread that has an access method type that differs from that of the first lock access implementation.

23. An apparatus, comprising:
    a processor; and
    a program configured to execute on the processor to process program code configured to access a lock by profiling the program code to collect metadata associated with the lock for a particular runtime environment, in a first thread attempting to access the lock being held by a second thread, accessing the metadata associated with the lock to determine an expected total wait time for the lock to be held, tracking a how long the lock has already been held by the second thread while the lock is held by the second thread, in the first thread, determining from the expected total wait time and how long the lock has already been held by the second thread an expected remaining wait time before the lock is released by the second thread, and based upon the expected remaining wait time, selecting from among a plurality of lock access implementations to access the lock.

24. A program product, comprising:
- a program configured to process program code configured to access a lock by profiling the program code to collect metadata associated with the lock for a particular runtime environment, in a first thread attempting to access the lock being held by a second thread, accessing the metadata associated with the lock to determine an expected total wait time for the lock to be held, tracking a how long the lock has already been held by the second thread while the lock is held by the second thread, in the first thread, determining from the expected total wait time and how long the lock has already been held by the second thread an expected remaining wait time before the lock is released by the second thread, and based upon the expected remaining wait time, selecting from among a plurality of lock access implementations to access the lock; and
- a computer readable recordable type medium bearing the program.

* * * * *